United States Patent [19]

Bouliane

[11] Patent Number: 4,554,884
[45] Date of Patent: Nov. 26, 1985

[54] TRAILER GEAR FOR SMALL CRAFT

[76] Inventor: Daniel Bouliane, 10,710 Olympia Blvd., Montreal, Canada, H2C 2W5

[21] Appl. No.: 587,687

[22] Filed: Mar. 8, 1984

[51] Int. Cl.[4] ............................................. B63B 7/02
[52] U.S. Cl. .............................. 114/344; 280/414.2; 114/361; 296/174
[58] Field of Search .............. 114/344, 343, 361, 189, 114/71, 203, 201 R; 280/414.1–414.3; 296/160, 168, 169, 173, 174, 156

[56] References Cited

U.S. PATENT DOCUMENTS

| | | | |
|---|---|---|---|
| 869,399 | 10/1907 | Walter | 114/361 |
| 1,477,111 | 12/1923 | Eaton | 296/174 |
| 1,595,541 | 8/1926 | Borah | 296/174 |
| 2,540,279 | 2/1951 | Mosier | 280/414.2 |
| 2,566,393 | 9/1951 | Wolfe | 280/414.3 |
| 2,909,378 | 10/1959 | Borchers | 280/414.2 |
| 3,164,392 | 1/1965 | Lane | 280/414.3 |
| 3,337,243 | 8/1967 | Rued | 280/414.2 |
| 3,612,566 | 10/1971 | Sholl | 280/414.2 |
| 4,180,881 | 1/1980 | Speranza | 114/344 |
| 4,188,963 | 2/1980 | Janoe | 296/174 |

Primary Examiner—Trygve M. Blix
Assistant Examiner—C. T. Bartz

[57] ABSTRACT

The trailer gear serves to tow a water-craft on the ground. This gear comprises a tow bar and two separate wheel assemblies. The tow bar is adapted to be rigidly and detachably secured directly to the bow of the hull of the craft and serves to hitch the hull to the back of a towing vehicle. Each wheel assembly includes a rigid frame carrying a spring suspension, to the outer end of which is mounted a ground-engaging wheel. Each frame is adapted to be rigidly attached to a respective side wall of the hull. When the craft is in water, each wheel assembly, together with the towing bar, can be easily detached from the hull and put inside the latter. The invention further discloses a protecting cover for the cockpit of the hull of a water-craft having a front deck. This protecting cover is provided on the inside with foldable legs engageable with the bottom of the hull to retain the cover in raised position over the cockpit to form a shelter against rain. Furthermore, the cockpit cover is convertible into a tent. For this purpose, the cover is placed upside down on the ground and bed panels hinged inside the cover are folded outwardly of the latter, and tent-supporting stays are erected over the cover and unfolded bed panels, ready to receive a tent fabric.

10 Claims, 11 Drawing Figures

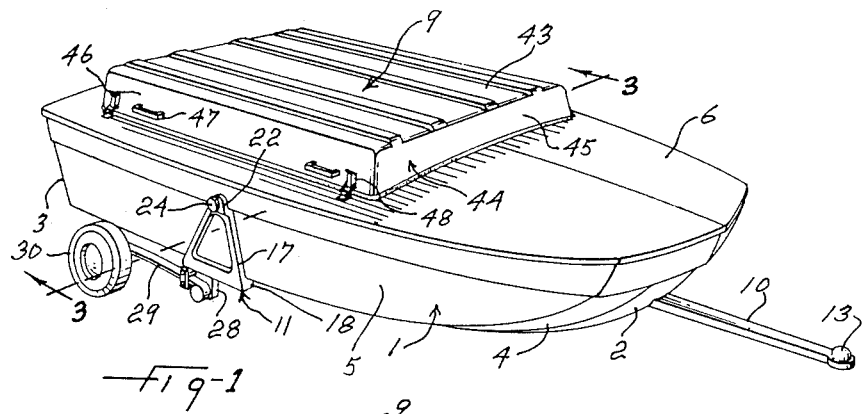
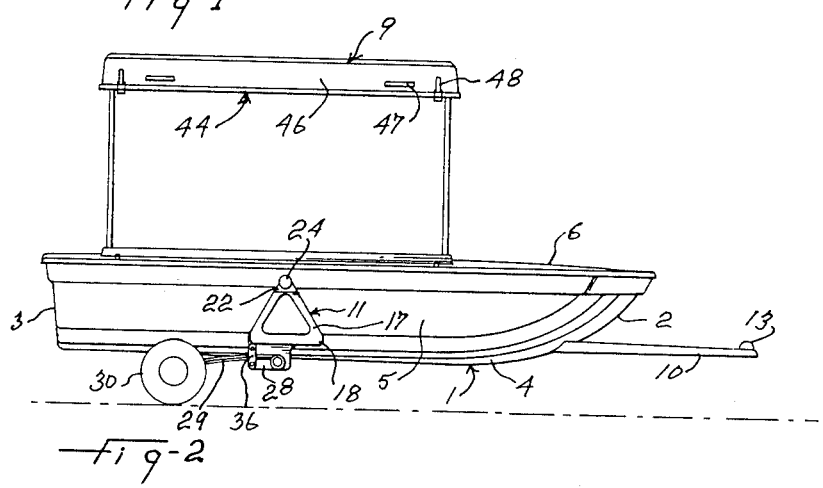
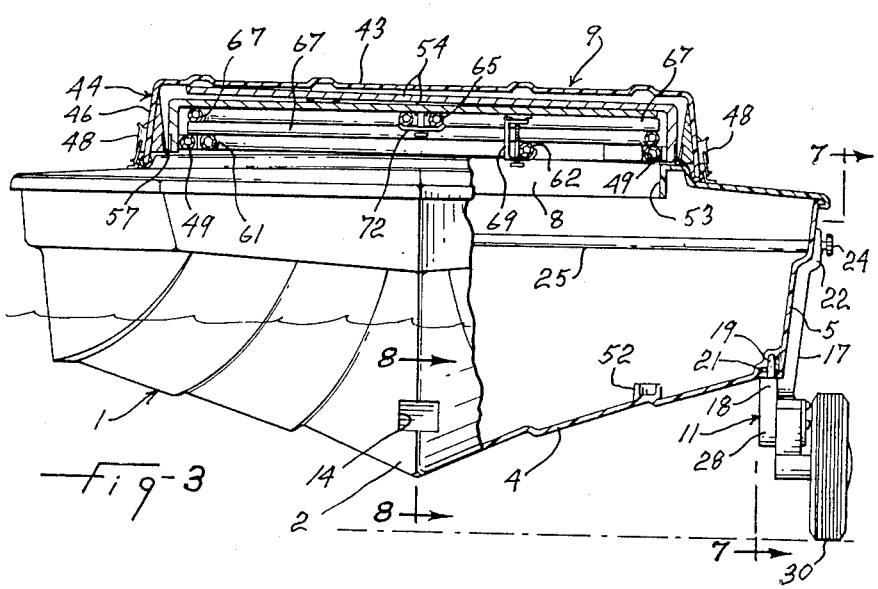

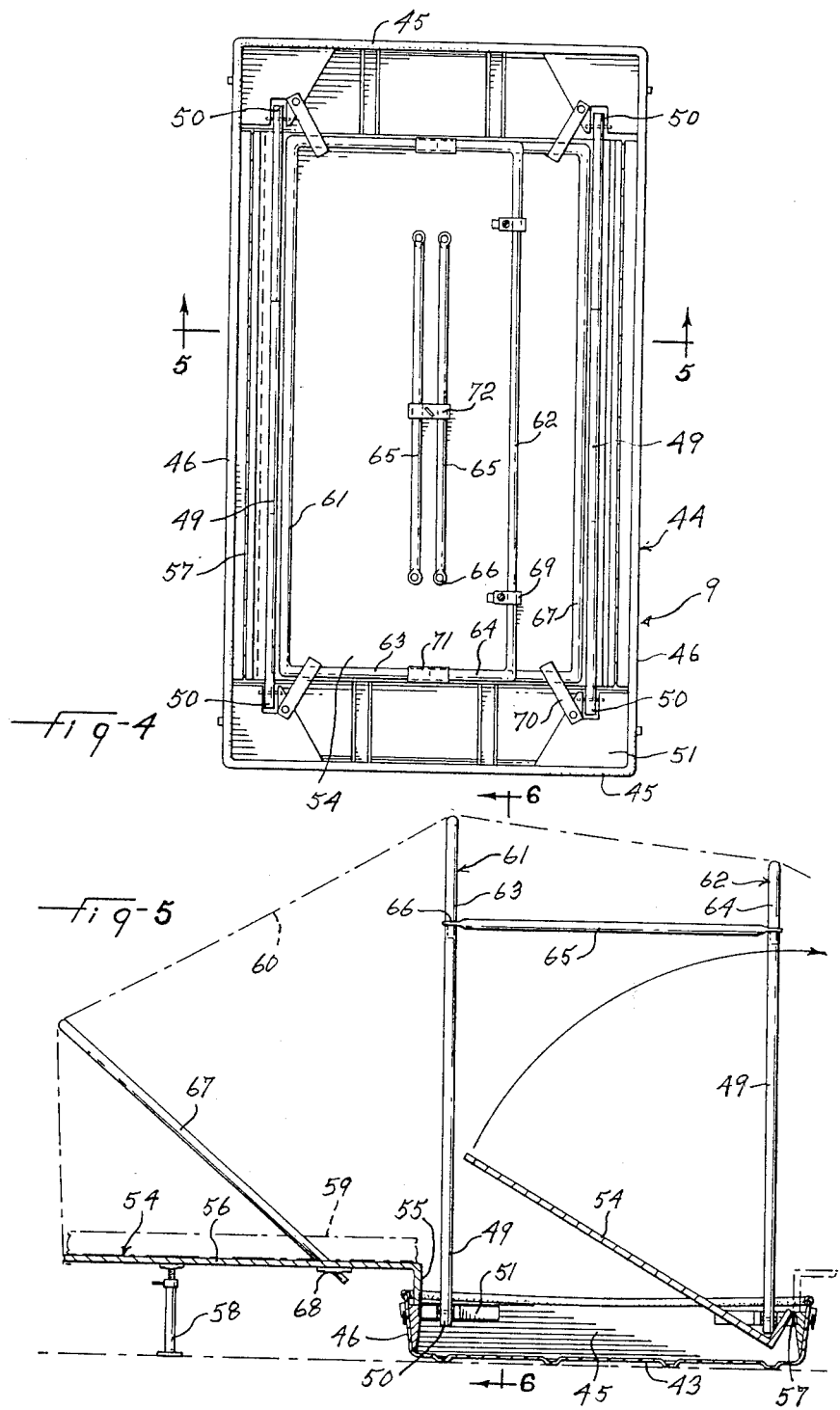

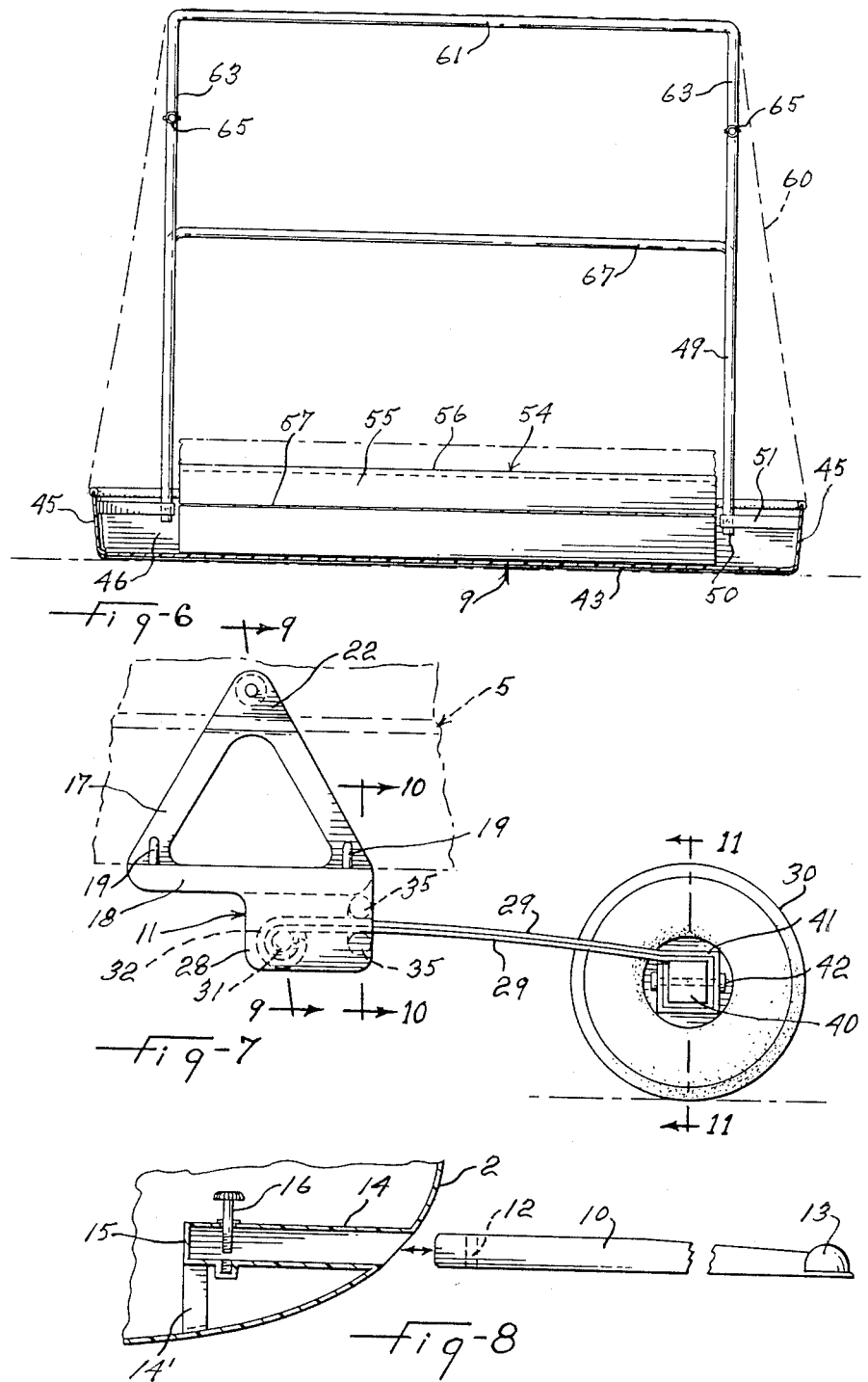

TRAILER GEAR FOR SMALL CRAFT

FIELD OF THE INVENTION

This invention relates to a trailer gear for water-craft for towing such a craft on the ground. The invention further contemplates a cover assembly for the cockpit of a water-craft which can be used as a shelter over the cockpit to protect the craft occupants against bad weather and which can also be converted into a tent for camping.

BACKGROUND OF THE INVENTION

Known trailers for towing a water-craft by a motor vehicle and consisting of a unitary frame including means to receive the hull on top of the frame stabilizing the same, together with wheels on each side of the frame and a towing bar at the front of the frame, have important drawbacks: they are of great weight, with the result that they are difficult to handle; they are quite expensive; and they take a large storage room.

It is known to provide a rigid removable cover for the open cockpit of a pressure craft. However, such a cockpit cover must be left on shore when using the water-craft and has no other use than to protect the inside of the craft hull when the latter is left unused.

OBJECTS OF THE INVENTION

It is therefore the main object of the invention to provide a trailer gear for a water-craft, which is made of light-weight detachable parts, using the craft hull itself as a frame for rigidly interconnecting the ground-engaging wheels and the towing bar.

It is another object of the invention to provide a trailer gear of the character described, the separate parts of which can have small individual dimensions to be easily stored within the boat hull itself when not in use.

Another object of the invention is to provide a craft cockpit rigid cover which can be converted for the use either as a shelter for the cockpit when the boat is travelling on water, or as a tent for camping while on the ground.

Other objects of the invention will appear by referring to a detailed description of the invention.

SUMMARY OF THE INVENTION

There is disclosed a trailer gear for a water-craft, preferably of small size, such as a pleasure craft. The trailer gear comprises a separate tow bar and two separate wheel assemblies. The tow bar has one end adapted to be rigidly and detachably secured to the bow of the hull of the craft and has means as its opposite end for hitching the same to the back of a towing vehicle. Each of the wheel assemblies includes a rigid frame; means to detachably secure each frame to a respective side wall of the craft on the outside of the latter, each frame having a lower lateral flange adapted to overlap the bottom of the hull, a ground-engaging wheel and a spring suspension connecting the ground-engaging wheel to the same. Preferably, each frame is of triangular shape, with the flange disposed along the base edge of the frame and carrying a pair of upstanding locating pins adapted to engage blind bores made in the bottom of the craft hull. Preferably also, a separate reinforcing rod, of a length adapted to extend transversely within the hull between the side walls of the same and contacting the inside of said side walls, has its ends adapted to engage fastening bolts carried by the frame and which extend through holes made in the boat hull.

This reinforcing rod prevents lateral tilting of the frames and hull side walls. Preferably, the spring suspensions are detachably connected to the frame for repair or replacement. The invention is also directed to a cockpit cover assembly which includes means to use the cockpit cover as a shelter when travelling on water, raised above the cockpit opening, and also to use this cockpit cover as a camping tent while on the ground.

BRIEF DESCRIPTION OF THE DRAWINGS

FIG. 1 is a perspective view of a water-craft provided with the trailer gear of the invention in operative position and also with a cockpit cover in closing position;

FIG. 2 is a side elevation of FIG. 1 but with the cockpit cover in raised position above the cockpit opening, to be used as a shelter when the boat travels on water, the trailer gear then being removed.

FIG. 3 is a front elevation of the craft partially in cross-section, this cross-section being taken along line 3—3 of FIG. 1, but with one wheel assembly being removed;

FIG. 4 is a plan view of the underside of the cockpit cover according to the invention;

FIG. 5 is a cross-section of the cockpit cover assembly, taken along line 5—5 of FIG. 4 but with the tent-supporting stays in operative position, together with one of the bed panels, the other bed panel being shown in intermediate folded position;

FIG. 6 is a longitudinal section taken along line 6—6 of FIG. 5;

FIG. 7 is an elevation of one of the trailer wheel assemblies looking at the inside face thereof;

FIG. 8 is a partial longitudinal section of the bow of the craft, taken along line 8—8 of FIG. 3, FIG. 8 also showing the tow bar about to be inserted within the bow;

In the drawings, like reference numerals indicate like elements throughout.

DETAILED DESCRIPTION OF THE DRAWINGS

Figure 9:
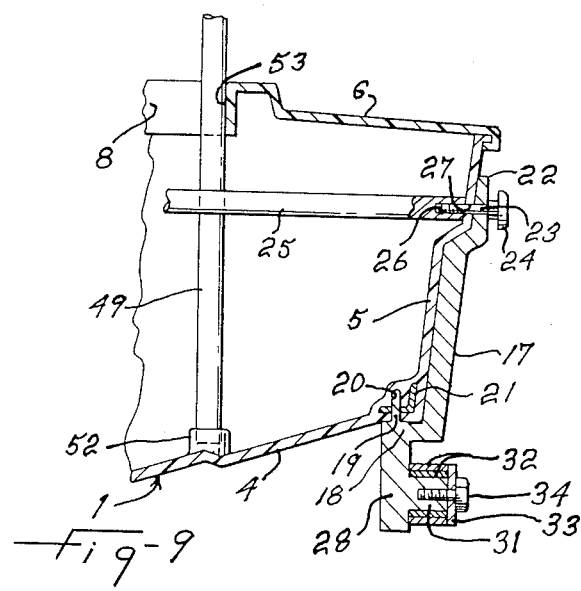
FIG. 9 is a section of one of the frame assemblies taken along line 9—9 of FIG. 6 and also showing the hull of the water-craft.
Figure 10:
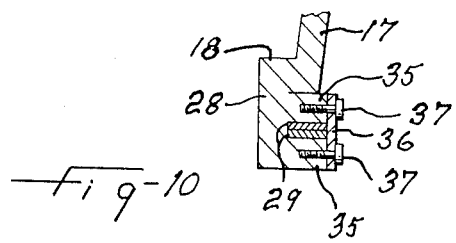
FIG. 10 is a cross-section along line 10—10 of FIG. 7.

FIGS. 1, 2, 3 show a conventional type of pleasure craft, the hull 1 of which is being generally made of molded, synthetic resin reinforced with glass fibers. The hull 1 includes a bow 2, a stern 3, a bottom 4, longitudinal side walls 5, a top deck 6 and a rear cockpit 7 having a generally rectangular opening 8, which is closed by a rigid cockpit cover 9 when the boat is not in use.

The trailer gear of the invention includes three separate assemblies adpated to be removably secured to the hull 1. These three assemblies include a tow bar 10 and two separate wheel assemblies 11. The tow bar 10, shown in FIGS. 1, 2, and 8, consists of a straight bar having a transverse bore 12 at its inner end and a coupling socket assembly 13, of conventional construction, adapted to be fitted over a conventional hitching ball, not shown, and carried at the rear end of a towing vehicle. The ball and socket hitch is of conventional construction and need not be described.

The inner end portion of the tow bar 10 is adapted to be removably and detachably attached directly to the bow 2 of the hull 1, in such a manner that the towing bar will extend along the center line of the hull 1. The preferred manner of attaching the tow bar to the bow of the hull is shown in FIGS. 3 and 8. The bow 2 of the hull is preferably modified to include an integral tubular socket 14 closed at its inner end 15, longitudinally extending along the center line of the hull 1 and opening at the bow exteriorly of the hull. The tubular socket 14 is preferably of rectangular cross-section and the inner portion of the tow bar has a similar cross-section adapted to have a sliding fit with the tubular socket. With the tow bar inserted within the tubular socket 14 against the closed end 15, the transverse bore 12 is opposite a fastening bolt 16 threaded through the tubular socket 14 and adapted to engage the through bore and retain the tow bar in position. Preferably, the tubular socket 14 is reinforced by a bracket 14' fixed to the inside of the boat hull. Access to the fastening bolt 16 is readily obtained from the inside of the hull underneath the top deck 6. The tow bar can be easily removed and stored within the boat when the latter is travelling on water. For this purpose, there is provided a tight seal around the bolt 16 to prevent water within the tubular socket 14 from entering the hull 1.

Each wheel assembly 11 is adapted to be detachably secured to a respective side wall 5 of the hull 1 on the exterior of the hull and intermediate the bow 2 and stern 3. Each wheel assembly 11 is of similar shape, being a mirror image of each other. Each wheel assembly 11 comprises a triangular open frame 17, made of rigid and light weight material, such as suitable aluminum alloy. Each frame may be cast as a one-piece unit. Each frame includes at its base edge an inwardly-directed flange 18 adapted to underlap the marginal portion of the bottom 4 of the hull 1 and fit said bottom. This flange 18 is provided with a pair of longitudinally-spaced and upstanding integral locating pins 19 (see FIGS. 7 and 9) adapted to be inserted within a pair of corresponding locating blind holes 20 made in the bottom 4 of the hull 1 adjacent the side walls 5, said blind bores extending also through a reinforcing right angle member 21 embedded within the synthetic resin of the hull 1 at the lower corner edges of the boat. Said reinforcing angle irons 21 are not essential. The apex 22 of the triangular frame 17, opposite the base flange 18, carries a fastening means and, preferably, a bolt 23 extending through a hole of this apex 22 and having an inner threaded end and an outer end formed with an actuating knob 24. The bolt 23 and locating pins 19 form the means for detachably fastening the frames 17 to the boat hull.

A rigid reinforcing rod 25, preferably tubular but provided with threaded plugs at both ends, as shown at 26 in FIG. 9, has a length equal to the distance between the side walls of the boat hull, so as to extend within the hull transversely of the same with its two end plugs 26 adapted to contact the inside face of the side walls 5 opposite the bolts 23, so that the latter, when screwed in position, will extend through holes 27 made in both side walls 5 opposite the reinforcing rod 25 near the top edge of the side wall. With the bolts 23 firmly screwed within the plugs 26 of the reinforcing rod 25, it will be appreciated that the two frames 17 form a very rigid structure by being interconnected by the reinforcing rod 25, with each hull side wall 5 sandwiched between the frame 17 and the reinforcing rod 25 and with the frames being rigidly fastened on the hull by the locating pins 19 at the bottom edge of the frames. Thus, lateral tilting of the two frame assemblies with respect to the hull and possible breakage of the hull side walls, is completely prevented, even when the craft is towed on rough ground.

Means, not shown, are preferably provided to rotatably retain the bolt 23 on the frame 17.

Each frame 17 has an integral extension 28 protruding downwardly from the base flange 18 and extending along part of the length thereof. Extension 18 is adapted to carry one end of a pair of leaf springs 29, the outer end of said leaf springs carrying a ground-engaging wheel, generally indicated at 30.

An integral cylindrical stud 31 is formed at the outside face of extension 28 and the inner ends of leaf springs 29 are curved around said stud 31, being removable therefrom. These curved ends 32 of the leaf springs 29 are retained in place by a retaining plate 33 overlapping the said curved ends 32 and removably retained on the stud 31 by a bolt 34 screwed within the stud 31 (see FIG. 9).

A pair of integral leaf spring locating studs 35 also extend from the outside face of the extension 28, rearwardly of stud 31, with a vertical spacing therebetween, equivalent to the total thickness of the two leaf springs 29, which are removably inserted between the studs 35 and retained therebetween by a retainer plate 36 impinging the gap between the two studs and fixed to the outside face of said studs by bolts 37. The retainer studs 35 engage a portion of the leaf spring spaced from their curved end 32 to rigidly secure said portion to the frame and cause flexing of the external portion of the springs under load.

From the foregoing, it is seen that the leaf springs can be readily detached from the associated frame 17 for repair or part replacement.

Figure 11:
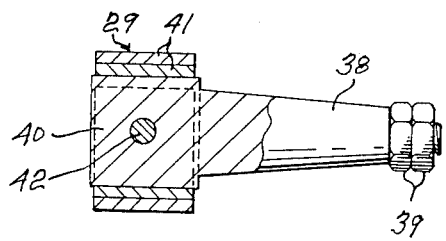
FIG. 11 is a cross-section, partially in elevation, taken along line 11—11 of FIG. 7 but with the wheel and its bearing not shown.

Each wheel 30 is of normal construction and has a hub provided with tapered roller bearings, not shown, adapted to be mounted on a spindle 38 and retained thereon by the usual fastening nuts 39 (FIG. 11). The spindle 38 is of tapered shape but has an inner end portion of generally rectangular cross-section, as shown at 40, around which are wrapped the outer end portions of the leaf springs 29, as shown at 41, said outer end portions being rigidly retained on the square inner end 40 of the spindle 38 by means of bolt-and-nut assembly 42.

The trailer gear can be easily fitted to and removed from the hull 1 while the craft is in water. The trailer gear assembly can be easily stored within the hull when not in use, if so desired.

When fitted on the boat for use over ground, the leaf springs extend alongside hull 1 rearwardly from frame 17 towards the stern 3. The leaf spring mounting forms a good suspension for the wheels 30. It will be noted that the hull 1 serves as a framework for the tow bar 10 and the two wheel assemblies 11. Obviously, the trailer gear of the invention can be fitted to any type of pleasure craft, including completely-open boats.

Another feature of the present invention consists in providing a cockpit cover which can be used as a shelter while the boat is travelling on water, and has part of a tent assembly for camping. The cockpit cover 9, as shown, is of rigid construction, preferably made of fiberglass reinforced synthetic resin. It has a generally rectangular shape with a main wall 43 and a depending skirt 44 formed by end walls 45 and longitudinal walls 46 meeting at the four corners of the rectangular shape cover. The cockpit cover 9 is preferably provided with lateral handles 47 for carrying the same and with latches 48 to secure the cover in operative position over the cockpit opening 8 of the boat, as shown in FIG. 1. In this position, the boat not being used, the inside of the hull is protected against bad weather and against theft of contents therein. Locking means are preferably provided to lock the cover in closed position.

As shown in FIG. 2, the cockpit cover 9 can be supported in raised position over the cockpit opening when the boat is travelling on water, the trailer gear being obviously removed. In this position, the cockpit cover serves as a shelter for the craft occupants.

For this purpose, four tubular legs 49 are pivoted at their inner ends at 50 (see FIG. 4) to a reinforcing corner web 51 formed at each of the four corners of the cockpit cover 9 inside the latter, said webs being parallel to and spaced from the main wall 43 of the cover 9, as shown in FIGS. 4 and 5. The legs 49 are normally folded within the cover in overlapping pairs, as shown in FIG. 4, and they can be unfolded to take an upright position at right angles to the main wall 43 with each of their outer ends removably engaging a socket 52 formed integral with the bottom wall 4 of the hull 1 inside thereof (see FIG. 9), each socket 52 being in vertical register with a respective corner 53 of the cockpit opening 8, so that this corner 53 engages an intermediate portion of the cover leg 49. In this manner, the cockpit cover 9 is firmly maintained in raised position over the cockpit opening by the four legs 49, even in rough water.

In accordance with another feature of the invention, the cockpit cover 9 carries means to form camper-type tent. For this purpose, a pair of bed panels 54 are provided. Each bed panel is of generally rectangular shape, with an L-shape cross-section defining a narrower leg 55 and a wider main leg 56, the free edge of the narrower leg 55 being pivoted inside the longitudinal walls 46 of the cover 9 by means, such as piano-hinge 57. The two bed panels 54 are thus pivoted to the opposite longitudinal walls 46 of the cover 9 to take a folded position, as shown in FIG. 3, wherein each bed panel overlaps each other within the cockpit cover, and an operative extended position, as shown in the left-hand side of FIG. 5, wherein the main leg 56 extends outwardly from the cover.

With the cover in inverted position and resting on the ground, the bed panel 54 is supported by a ground-engaging jack 58, or any other means, and is ready to receive a bed mattress 59, or any other type of bedding. A framework is provided to support a tent fabric, indicated at 60. This framework is collapsible and can be stored within the cockpit cover 9. This framework also includes the four above-noted legs 49 for holding the cover in the cockpit opening sheltering position shown in FIG. 2.

Apart from legs 9, the framework includes a pair of U-shape tent-supporting yokes 61, 62 with yoke 61 having longer legs 63 than the legs 64 of yoke 62. Legs 63 have an outer end of restricted cross-section adapted to slidably fit within the outer hollow end of tubular legs 49, so as to form a continuation thereof, as shown in FIG. 5. The same removable connection applies to legs 64 of yoke 62. Each yoke 61, 62 is adapted to fit the outer end of a pair of the longitudinally-opposite legs 49, so as to extend longitudinally of the cover when the framework is in erected position, as shown in FIGS. 5 and 6. The framework, consisting of unfolded legs 49 and yokes 61 and 62, is reinforced against lateral tilting by transverse stays 65, each having an eye 66 at both ends adapted to removably and slidably receive the ends of legs 63, 64.

An additional yoke 67 is provided for each of the bed panels 54. The transverse part of each yoke 67 is adapted to extend longitudinally of the bed panel vertically above approximately the outer edge thereof when the latter is in operative position, while the legs of each yoke 67 extends upwardly and outwardly at an angle, the outer ends of each yoke being removably retained within holes in the bed panel, as shown at 68 in FIG. 5.

The tent fabric 60 is removably retained on the yokes 61, 62, and 67 so as to form a relatively large enclosure, the tent fabric being provided with suitable snap means at their edges to be attached to the outer edges of the bed panels and also, if desired, to the free edges of the end walls 45, there being provided suitable door means in the tent fabric for access within the tent.

All of the framework just described, namely: the yokes, 61, 62, 67, together with the transverse stays 65, can be stored within the cockpit cover 9 and retained therein over the folded bed panels 54 by means of suitable retainer means including hooks 69, pivotable arms 70, and sleeves 71, the latter engaging the free ends of the legs 63, 64 of yokes 62, 63, respectively.

The stays 65 are retained in stored position by a double hook 72. Therefore, all the tent-supporting framework is stored within the cover when not in use and the cover can be in turn fixed to the deck 6 of the boat.

What I claim is:

1. A trailer gear for water craft, said craft including a hull having side walls, a bottom, a stern, a bow, and a generally horizontal and flat marginal portion formed between each said side wall and said bottom intermediate said stern and said bow, said trailer gear comprising a tow bar and two independent separate wheel assemblies, said tow bar being elongated and rigid, having one end adpated to be rigidly and detachably secured to the bow of said hull and having means at its opposite end for hitching the same to a towing vehicle, each of said wheel assemblies including a rigid frame conforming to the cross-sectional profile of each side wall, means to detachably secure each said frame to a respective side wall externally of said hull, each frame having a lower lateral flange adapted to underlap the said marginal portion of said hull and support the same thereat, a ground-engaging wheel and a spring suspension connecting said ground-engaging wheel to said frame in a nonadjustable manner whereby said wheels support said craft in upside-up position above ground level when said craft is being towed by a towing vehicle through said bar.

2. A trailer gear as claimed in claim 1, wherein each of said frames is of unitary triangular shape adapted to engage the side wall of said hull and has a pair of short generally vertical locating pins upwardly extending from, and secured to, said flange at either end thereof for engaging, a pair of vertical blind holes formed in said marginal portion of said hull, said pins being adapted to engage said blind holes with said flange applied against said marginal portion, and further including fastener means at the apex of said frame for attaching said apex to the side wall of said hull, said locating pins and fastener means constituting the means to secure the frame to the hull.

3. A trailer gear as defined in claim 2 wherein said fastener means is an actuating knob having an inner threaded end extending through said frame and the respective said side wall, means to rigidly retain said inner threaded end in locking relationship with the respective said side wall adjacent the upper edge thereof.

4. A trailer gear as defined in claim 3 wherein said means to retain said inner threaded end consists of a rigid reinforcing rod of a fixed length having threading complementary to said inner end at either of its respective ends; said rod extending transversely between and contacting the said side walls whereby the rod may be rigidly and detachably secured to the upper ends of said frames by screwing said actuating knob inner ends into said complementary threading formed in said respective ends of said rod, whereby vibration of the hull side walls is effectively prevented.

5. A trailer gear as defined in claim 2, wherein each ground-engaging wheel has a stub axle and is rotatably mounted thereon, and said suspension includes leaf springs having a rear end rigidly secured to said stub axle and the other end attached to said frame, said leaf springs adapted to extend rearwardly from said frame alongside and towards the stern of said craft and acting as the sole suspension and support for each said wheel.

6. A trailer gear as defined in claim 5, wherein each frame has an extension depending downwardly from the base thereof, a cylindrical stud laterally outwardly protruding from said extension, said leaf springs having a front end coiled around said stud, a pair of vertically spaced additional studs protruding from said extension rearwardly of said first-named stud, said leaf springs having a straight part sandwiched between said pair of additional studs and spaced from said first-named stud, said additional studs acting as a pivot point for the portions of said leaf springs extending rearwardly thereof, and a retainer plate removably attached to said studs and overlying said leaf springs to retain said leaf springs on said first-named stud and between said additional studs, said leaf springs being removable from said frame upon removal of said retainer plate, whereby each said wheel is limited to resilient movement in the vertical longitudinal plane thereof without lateral leaning, disalignment or deflection.

7. The trailer gear of claim 6, in combination with said craft, said craft having a single permanent elongated tubular member extending rearwardly within the bow of said hull along the longitudinal center line of said hull, said tubular member having an opening at the exterior of said hull at said bow and flush therewith, and closed at its inner end, said tubular member having a smooth inner surface and a cross-sectional size and shape to slidably receive the inner end portion of said tow bar, said means to attach said tow bar to said craft being accessible only from within said bow and comprising a bolt sealingly threaded across the inner end portion of said tubular member and engageable with a transverse bore made in the inner end portion of said towing bar, and support means inside said bow to hold said tubular member in place.

8. The combination of the trailer gear as defined in claim 1 with said water craft, the latter having a rectangular cockpit opening forming four corners and a removable rigid cockpit cover having a main wall and a depending skirt around said main wall, four legs each pivotally secured at one end to said cover at one corner thereof and within said cover, each said leg having a free outer end, said legs being thereby pivotally foldable between a folded position within said cover and an operative position at right angles to said main wall, said cover further including separate frame members storable within the cover when not in use, whereby:

(a) said cover may be secured in raised position above said cockpit opening by pivoting said legs to said operative position, said outer ends removably engaging a retaining means fixed to the bottom of said hull, the intermediate portion of said legs abutting the respective said corners, or (b) said cover may be entirely removed from the water craft and placed upside down on a supporting surface, said legs being pivotable to said operative position and said frame members being removably connectable to said outer ends to support a tent fabric over said cover.

9. The combination of claim 8 wherein said separate frame members include a pair of U-shaped yokes, each removably connectable to the outer ends of a pair of said legs when said legs are in operative position, one of said yokes having longer arm portions.

10. The combination of claim 9, further including at least one cross-sectionally L-shaped bed panel having a narrow leg and a wider leg, the edge of said narrow leg being hinged to one longitudinal side of said depending skirt and pivotable with respect to said cover between an inoperative folded position within said cover and an operative position extending laterally outwardly of said cover, the said wider leg of the panel being adapted to rest against the inner surface of said main wall in inoperative position, said frame members further including an additional U-shape yoke having an elongated horizontal portion corresponding to the length of said cover and having its arms removably attached to the end of said panel over the same to further support said tent fabric over the panel when in operative position.

* * * * *